Dec. 28, 1965  A. S. WATKINS  3,225,807
NUTS

Filed Sept. 24, 1963  2 Sheets-Sheet 1

INVENTOR
Arthur Sidney Watkins
BY
William R. Liberman
ATTORNEY

Dec. 28, 1965    A. S. WATKINS    3,225,807
NUTS

Filed Sept. 24, 1963    2 Sheets-Sheet 2

INVENTOR
BY Arthur Sidney Watkins
William R. Liberman
ATTORNEY

United States Patent Office 3,225,807
Patented Dec. 28, 1965

3,225,807
NUTS
Arthur Sidney Watkins, 9 Courtland Terrace,
Merthyr Tydfil, Glamorgan, Wales
Filed Sept. 24, 1963, Ser. No. 311,175
Claims priority, application Great Britain, Sept. 25, 1962,
36,311/62
3 Claims. (Cl. 151—7)

This invenion relates to nuts.

It is an object of the present invention to provide a nut which is capable of receiving a variety of screw thread sizes, which nut provides advantages in use and assembly.

According to the invention there is provided a nut or like member provided with three sets of parallel faces disposed substantially at right angles to each other at least one of the faces of at least two of the sets being provided with an aperture for receipt of a threaded member, the aperture of one set being adapted to receive a threaded member of different size than said other apertures.

The apertures for receipt of the threaded members may be screw threaded or may be capable of self threading for example if they are of a plastic material such as nylon, or of other material which may be self threaded using a screw of hard material such as metal.

The not according to the invention is preferably in the form of a cube or near cube, the faces of which are provided with apertures for receipt of the threaded members. The apertures of at least two adjacent faces are of different dimensions.

The nut may be adapted to serve as a lock nut, for example by making one or more of the surfaces of the nut serrated or roughened. A locking action is also obtained by making the nut of a self-threading material such as plastic or fibrous material and leaving the apertures unthreaded or threaded in part. The locking may also be effected by providing locking means comprising a locking member of plastic material such as nylon, fibre or the like. The locking member may, for example take the form of a collar in a counterbored depression. If desired the collar may be provided with profiled paths which coincide with the screws and which may be tapered or otherwise modified as desired. One may also provide a portion of locking plastic material in the form of a wedge or like member, such a locking member may be positioned across a corner or a face of the nut, to provide locking engagement with at least one of the screws.

The locking collar or device may be kept in position by any suitable method, including bonding with adhesives, spinning-over, riveting, pinning, press or force fitting, screwing or by suitable indentations produced by centre punching.

The nuts according to the invention preferably have chamfered corners and/or edges.

If desired the size of the various apertures may be identified by suitable colour coding or size stamping of the faces or dot-marking as with dice may be employed.

The nuts according to the invention make possible the ready assembly of components provided with screws of differing thread sizes and also for the locking of such components with relation to each other.

In order that the invention may be more fully understood, preferred embodiments thereof will now be described by way of illustration only, with reference to the accompanying drawings, in which.

Figure 1:
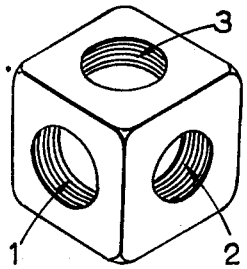
FIGURE 1 is a perspective view of a conventional form of nut adapted for use with the present invention.
Figure 2:
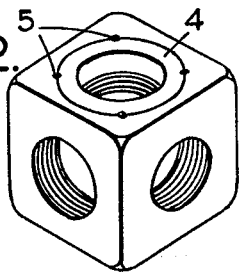
FIGURE 2 is a perspective view of a nut provided with plastic locking elements according to the present invention.
Figure 5A:
FIGURES 5a, 5b and 5c are, respectively, a top plan, end elevation and side elevational views of a different form of nut also constructed according to and embodying the present invention.
Figure 6A:
FIGURES 6a, 6b and 6c are, respectively, a top plan, end elevation and side elevational views of a further form of nut also constructed according to and embodying the present invention.
Figure 5B:
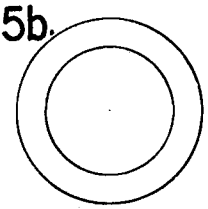
Figure 5C:
Figure 6B:
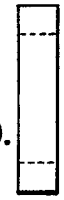
Figure 6C:
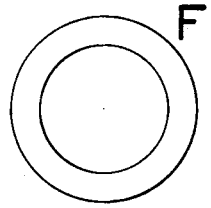
Figure 7A:
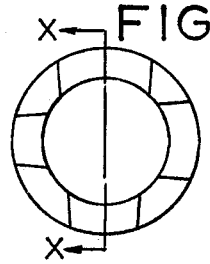
FIGURES 7a and 7b are, respectively, a top plan and a section on the line X—X through FIGURE 7a of still another form of nut provided with plastic locking elements in accordance with the present invention.
Figure 7B:
Figure 9A:
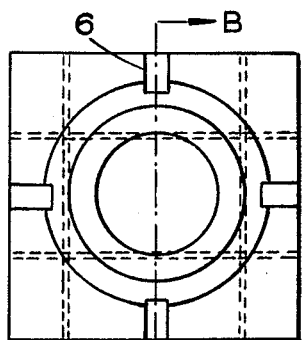
FIGURES 9a and 9b are respectively a top plan and a vertical section along line B—B of FIGURE 9a of a further form of lock nut constructed according to and embodying the present invention.
Figure 9B:
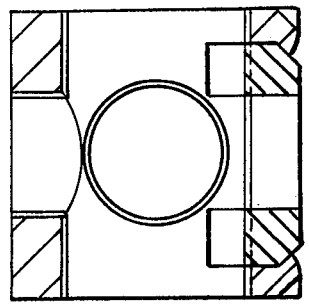

Referring to FIG. 1 a nut according to the invention is provided with apertures 1, 2 and 3 which are screw threaded and adapted to receive screws of three different thread sizes. In FIG. 2 there is shown a nut which is the same as that shown in FIG. 1 with the exception that one aperture thereof is provided with a plastic collar 4 kept in position with countersunk indentations 5. This collar which is shown in more detail in FIG. 6 acts as a locking element and is made from nylon or other suitable locking material. The underside of the collar may be profiled as shown in FIG. 5 to give a uniform area of contact (or bite) with the mating screw or screws. The collar may also be modified as shown in FIG. 7 to provide a profiled path which is tapered so that the screwed diameter approaches from the wide end which it may clear entirely or partially. As the screw progresses or moves forward into the nut it meets increasing resistance until full lock is achieved at the exit end of the nut. If immediate or early locking is required the mating screw may be inserted at the narrow end of the taper. In FIG. 9 the locating of the collar with relation to the nut is shown in more detail. In this case it is effected by providing displaced metal notches which bear down on the chamfered edge of the collar.

Figure 3:
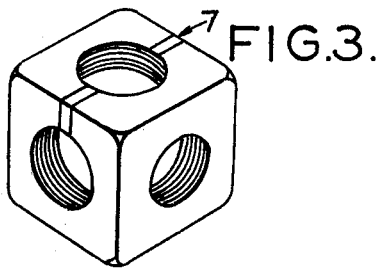
FIGURE 3 is a perspective view of a nut provided with plastic locking elements otherwise disposed on said nut in accordance with the present invention.
Figure 4:
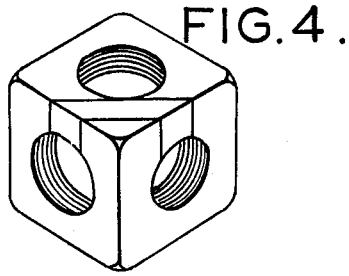
FIGURE 4 is a perspective view of a nut provided with plastic elements still differently disposed on said nut also in accordance with the present invention.
Figure 10A:
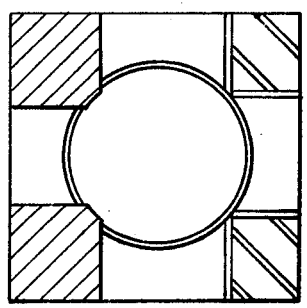
FIGURES 10a and 10b are, respectively, a section through line A—A of FIGURE 10b and a plan view of a still further form of lock nut constructed according to and embodying the present invention.
Figure 10B:
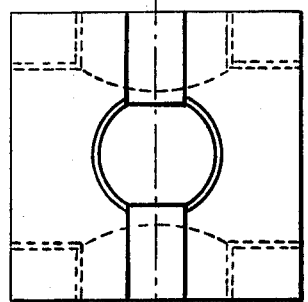
Figure 11A:
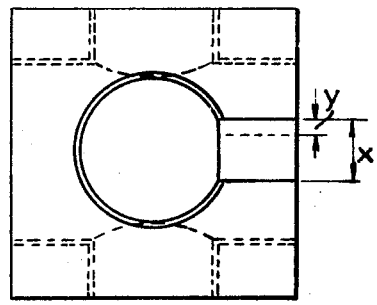
FIGURES 11a and 11b are, respectively, a side elevation and a top plan view of the form of nut shown in FIGURE 4.
Figure 11B:
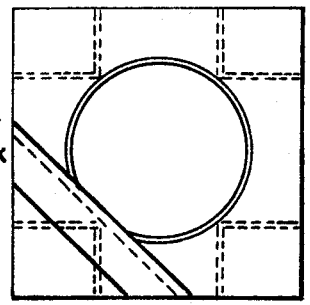

In FIG. 3 there is shown another embodiment of the invention in which the locking element takes the form of a slice of locking material of plastic 7 located across the nut. A somewhat similar slice of locking material may be placed across a corner of the nut, shown at FIG. 4. In FIG. 10 two further views of the nut as shown in FIG. 3 are illustrated, and in FIG. 11 two further views of the nut as shown in FIG. 4. That component of plastic or fibrous material may be wide as shown at X in FIG. 11 or, narrow as shown at Y in FIG. 11, depending on the intended use.

Figure 8:
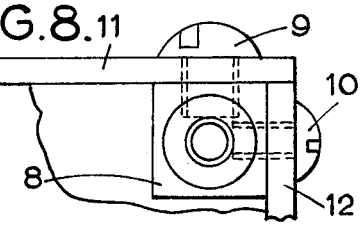
FIGURE 8 is a side elevational view of a plurality of panels assembled by means of a nut constructed according to and embodying the present invention.

Finally, in FIG. 8 there is shown the use of a nut according to the invention in assembling two or three adjacent panels without the necessity of employing extra fixtures or fixing brackets. In the figure, 8 is the nut and 9 and 10 are the screws used for positioning the panels 11 and 12.

I claim:

1. A multiple nut device comprising a cubic body member including mutually perpendicular pairs of transversely spaced substantially square parallel faces having three mutually intersecting and perpendicular apertures formed and extending completely through said cubic body, the apertures of at least two adjacent faces being of different dimensions and adapted to engage correspondingly different screw members, and a common locking member carried by said body member in longitudinal alignment with an aperture of each of said pairs thereof, said locking member comprising a collar member of relatively soft material resting partially in one of said screw engaging apertures and having an inner edge extending inwardly into longitudinal alignment with each of the other screw engaging apertures whereby a locking means is provided in all three intersecting apertures.

2. The multiple nut device of claim 1 wherein said inner edge has arcuate recesses formed therein coaxial with and conforming substantially in curvature to said respective other screw engaging apertures.

3. A multiple nut device comprising a cubic body member including mutually perpendicular pairs of transversely spaced substantially square parallel faces having three mutually intersecting and perpendicular apertures formed and extending completely through said cubic body, the apertures of at least two adjacent faces being of different dimensions and adapted to engage correspondingly different screw members, and a common locking member carried by said body member in longitudinal alignment with an aperture of each of said pairs thereof, said body member having a slot formed therein extending diagonally across a corner thereof and communicating with all three intersecting apertures, and said locking member comprising a block of relatively soft plastic material disposed in said slot and extending into longitudinal alignment with each of said screw engaging apertures.

References Cited by the Examiner

UNITED STATES PATENTS

| 664,415 | 12/1900 | Knox | 85—5 |
| 2,058,263 | 10/1936 | Rosendale. | |
| 2,962,317 | 11/1960 | Morse | 85—32 |
| 2,968,821 | 1/1961 | Morin et al. | 151—7 |
| 3,030,997 | 4/1962 | Collins | 151—7 |
| 3,039,508 | 6/1962 | Greene | 151—7 |

FOREIGN PATENTS

| 536,828 | 2/1957 | Canada. |
| 735,189 | 8/1932 | France. |
| 1,126,859 | 7/1956 | France. |
| 1,228,731 | 3/1960 | France. |
| 238,292 | 10/1945 | Switzerland. |

CARL W. TOMLIN, *Primary Examiner.*

M. HENSON WOOD, Jr., EDWARD C. ALLEN,
*Examiners.*